(12) United States Patent
Wang

(10) Patent No.: US 12,730,453 B2
(45) Date of Patent: Sep. 8, 2026

(54) REMOTE DRIVING CONTROL APPARATUS

(71) Applicant: TOYOTA JIDOSHA KABUSHIKI KAISHA, Toyota (JP)

(72) Inventor: Chenyang Wang, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/095,724

(22) Filed: Mar. 31, 2025

(65) Prior Publication Data

US 2025/0348068 A1 Nov. 13, 2025

(30) Foreign Application Priority Data

May 7, 2024 (JP) ................................ 2024-075236

(51) Int. Cl.
*G05D 1/224* (2024.01)
*G05D 1/222* (2024.01)
*G05D 1/633* (2024.01)
*G05D 1/65* (2024.01)
*G05D 109/10* (2024.01)

(52) U.S. Cl.
CPC .......... *G05D 1/224* (2024.01); *G05D 1/2235* (2024.01); *G05D 1/633* (2024.01); *G05D 1/65* (2024.01); *G05D 2109/10* (2024.01)

(58) Field of Classification Search
CPC .......... G05D 1/224; G05D 1/65; G05D 1/633; G05D 2109/10
USPC ........................................................ 701/2
See application file for complete search history.

(56) References Cited

U.S. PATENT DOCUMENTS

2018/0196426 A1* 7/2018 Kim ........................ B61L 27/57
2023/0114701 A1* 4/2023 Yeung .................. H04W 12/08 455/411
2024/0255605 A1 8/2024 Sanji et al.
2025/0249926 A1* 8/2025 Terai ..................... B60W 50/16

FOREIGN PATENT DOCUMENTS

DE 102022101237 A1 * 7/2022 ........... H04W 64/00
JP 2019109616 A 7/2019
JP 2023058256 A 4/2023

OTHER PUBLICATIONS

English translation of DE102022101237. (Year: 2022).*

* cited by examiner

*Primary Examiner* — Tiffany P Young
(74) *Attorney, Agent, or Firm* — Hunton Andrews Kurth LLP

(57) ABSTRACT

A remote driving control apparatus is configured to execute a remote driving control for driving a vehicle to a target space according to a driving instruction from a remote operation apparatus operated by a user outside the vehicle. The remote driving control apparatus is configured to execute at least one of a notification control and a low-speed control as an interference control when an interference object that prevents the user from seeing the vehicle is present between the remote operation apparatus and the vehicle. The notification control is a control for notifying the user that the interference object is present. The low-speed control being a control for setting an upper limit speed to a smaller value than when the interference object is not present.

5 Claims, 6 Drawing Sheets

REMOTE DRIVING CONTROL APPARATUS

CROSS-REFERENCE TO RELATED APPLICATION

This application claims priority to Japanese Patent Application No. 2024-075236 filed on May 7, 2024, which is incorporated herein by reference in its entirety.

TECHNICAL FIELD

The present disclosure relates to a remote driving control apparatus for performing a remote driving control for driving a vehicle to a target space according to a driving instruction from a remote operation apparatus operated by a user outside the vehicle.

BACKGROUND

Conventionally, there has been known a remote driving control apparatus for performing a remote driving control. For example, a remote driving control apparatus described in Patent Document 1 (hereinafter referred to as a "conventional apparatus") performs the remote driving control for parking or exiting a vehicle when a user located at a relatively short distance from the vehicle operates a remote operation apparatus.

Patent Document 1: Japanese Patent Application Laid-Open No. 2019-109616

SUMMARY

During the remote driving control, the user must monitor the vehicle by sight. If an interference object between the user and the vehicle is present, a possibility that the user cannot see the vehicle increases. The interference object is an object that prevents the user from seeing the vehicle. A contact possibility that the vehicle contacts with an object is higher when the user cannot monitor the vehicle than when the user monitors the vehicle.

However, with the conventional apparatus, the contact possibility increases when the interference object is present, because the conventional apparatus does not perform any special control when the interference object is present.

The present disclosure is made to address the above problem. That is, one of the objects of the present disclosure is to provide a remote driving control apparatus for preventing an increasing in the contact possibility even when the interference object is present.

A remote driving control apparatus according to the present disclosure (hereinafter, referred to as "the present disclosure apparatus") is configured to execute a remote driving control for driving a vehicle (VA) to a target space according to a driving instruction from a remote operation apparatus (20) operated by a user outside the vehicle.

The remote driving control apparatus is configured to execute at least one of a notification control (step 360) and a low-speed control (step 355) as an interference control when an interference object (OBS) that prevents the user from seeing the vehicle is present between the remote operation apparatus and the vehicle ("No" at step 330).

The notification control is a control for notifying the user that the interference object is present.

The low-speed control is a control for setting an upper limit speed to a smaller value than when the interference object is not present.

The present disclosure apparatus executes at least one of the notification control and the low-speed control when the interference object is present. The notification control can increase a possibility that user notices that the interference object is present and the user takes an appropriate action, such as moving to a position where the user can see the vehicle without being interfered by the interference object. This will prevent the contact possibility from increasing. The low-speed control shortens a time which it takes for the vehicle to stop, so the low-speed control can prevent the contact possibility from increasing.

DETAILED DESCRIPTION

Figure 1:
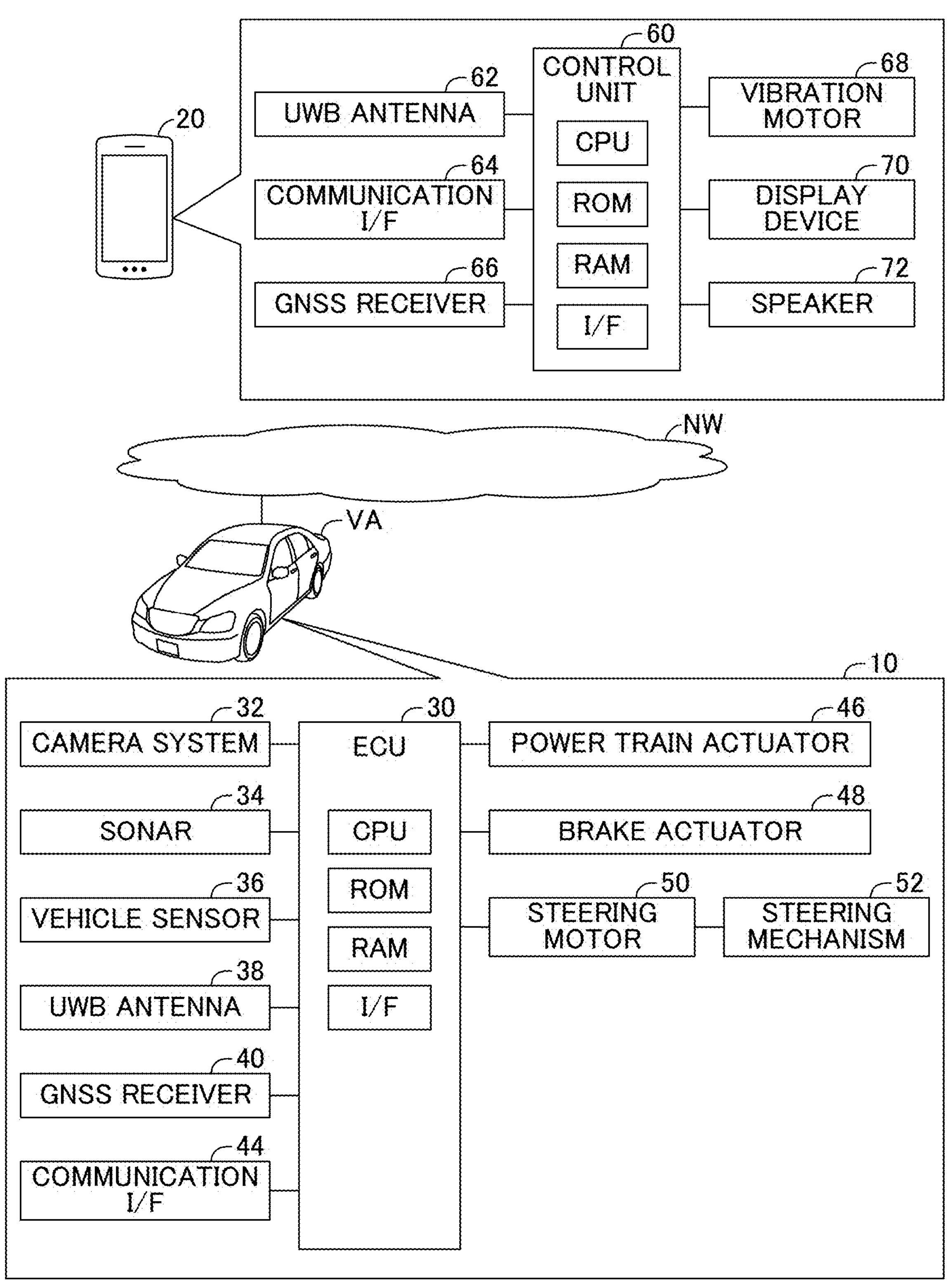
FIG. 1 is a schematic system configuration diagram of a remote driving control apparatus and a remote operation apparatus according to an embodiment of the present disclosure.

As shown in FIG. 1, a remote driving control apparatus 10 (hereinafter referred to as "the present apparatus 10") is applied to a vehicle VA. The remote driving control apparatus 10 is connected to a remote operation apparatus 20 via a network NW.

The present apparatus 10 comprises components shown in FIG. 1. In this specification, the "ECU 30" is an electronic control unit with a microcomputer as a main part. The ECU 30 is also referred to as a control unit, a controller and a computer. The microcomputer includes a CPU (processor), a ROM, a RAM, and an interface (I/F), etc. Functions realized by the ECU 30 may be realized by multiple ECUs.

A camera system 32 comprises a front camera and a rear camera. The front camera acquires a front image by shooting a scenery in front of the vehicle VA. The rear camera acquires a rear image by shooting a scenery behind the vehicle VA. A sonar 34 acquires sonar data related to a position of an object around the vehicle VA relative to the vehicle VA. The ECU 30 acquires the front image and the rear image from the front camera and the rear camera, respectively, and acquires the sonar data from the sonar 34. The ECU 30 recognizes the object around the vehicle VA based on the front image, the rear image, and the sonar data.

A vehicle speed sensor 36 measures a vehicle speed Vs, which indicates a speed of the vehicle VA. The ECU 30 acquires the measured value of the vehicle speed sensor 36.

A UWB (Ultra-Wide Band) antenna 38 performs UWB wireless communication with another apparatus equipped with the UWB antenna.

A GNSS (Global Navigation Satellite System) receiver 40 receives signals from multiple satellites and uses the received signals to identify (specify) the current position (latitude and longitude) of the vehicle VA. A communication interface (I/F) 44 is an interface for connecting the present apparatus 10 to the network NW.

A power train actuator 46 changes a driving force generated by a driving device (e.g., an internal combustion engine and/or an electric motor) of the vehicle VA. A brake actuator 48 controls a braking force applied to the vehicle VA. A steering motor 50 is installed in a steering mechanism 52. The steering mechanism 52 is a mechanism for turning steered wheels in response to an operation of a steering wheel. The steering motor 50 generates an automatic steering torque to change a steered angle θ of the steered wheels of the vehicle VA in response to an instruction from the ECU 30. The remote operation apparatus 20 is an apparatus that can be operated even when a user US (referring to FIG. 2) is outside the vehicle VA. For example, the remote operation apparatus 20 is a smartphone. The remote operation apparatus 20 comprises components shown in FIG. 1.

A control unit 60 includes a CPU (processor), a ROM, a RAM, and an interface (I/F), etc. A UWB antenna 62, a communication I/F 64, and a GNSS receiver 66 are the same as the UWB antenna 38, the communication I/F 44, and the GNSS receiver 40, respectively. These will be omitted from the description.

A vibration motor 68 is a motor for vibrating the remote operation apparatus 20. A display device 70 is a touch panel display that allows the user US to input data into the remote operation apparatus 20 by touching the display device 70. A speaker 72 outputs sound.

<Remote Driving Control>

When the user US outside the vehicle VA performs a specified operation on the remote operation apparatus 20, the remote operation apparatus 20 transmits a driving instruction to the present apparatus 10 via the network NW. The present apparatus 10 executes a remote driving control according to the driving instruction. The remote driving control is a control for automatically driving the vehicle VA to the target space. For example, a smart summon and a reverse summon are known as the remote driving control.

In the smart summon, the vehicle VA automatically drives from "the parking space where the vehicle VA is parked" to the target space. The target space is set to the current position of the remote operation apparatus 20, which is identified by the GNSS receiver 66, or a specified location designated by the user US. In the reverse summon, when the user US, who has gotten out of the vehicle VA at an entrance of a parking lot, etc., operates the remote operation apparatus 20, the vehicle VA parks in the parking space (the target space) designated by the user US.

In the remote driving control, an upper limit speed Vlmt is set, and the present apparatus 10 controls the powertrain actuator 46 and the brake actuator 48 so that the vehicle speed Vs does not exceed the upper limit speed Vlmt. It should be noted that the upper limit speed Vlmt is set to a predetermined speed Vs1 when an interference object OBS is present.

(Outline of Operation)

Figure 2:
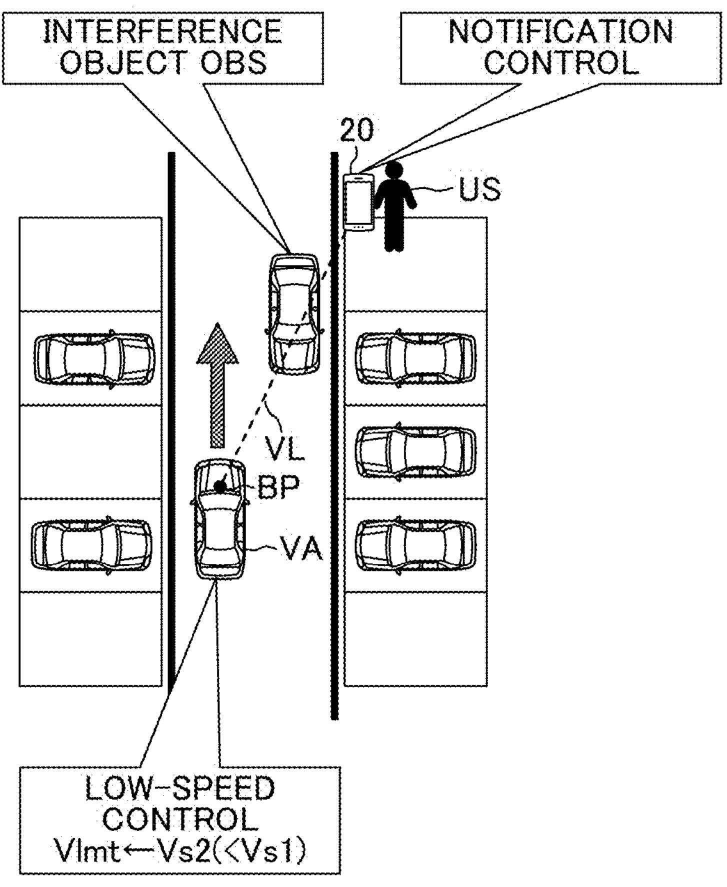
FIG. 2 is a drawing for illustrating an outline of an operation of the remote driving control apparatus.

Referring to FIG. 2, an outline of an operation of the present apparatus 10 is described.

The present apparatus 10 identifies the position of the remote operation apparatus 20 relative to the vehicle VA, while the present apparatus 10 is performing the remote driving control. The present apparatus 10 and the remote operation apparatus 20 perform the UWB wireless communication using the UWB antennas 38 and 62. The present apparatus 10 performs the UWB wireless communication to identify the position of the remote operation apparatus 20 relative to the vehicle VA.

The present apparatus 10 identifies the position of the object around the vehicle VA relative to the vehicle VA based on the front image, the rear image, and the sonar data. The present apparatus 10 determines that the interference object OBS is present between the vehicle VA and the remote operation apparatus 20 when an object that blocks a virtual line VL is present between the position of the remote operation apparatus 20 and a predetermined reference point BP of the vehicle VA. The interference object OBS is an object that interferes with the user US's line of sight to the vehicle VA.

When the interference object OBS is present, the present apparatus 10 executes a notification control and a low-speed control as an interference control. The notification control is a control for informing the user US that the interference object OBS is present. In the low-speed control, the upper limit speed Vlmt of the remote driving control is set to "a speed Vs2 lower than the above speed Vs1".

The notification control includes at least one of a vibration control, a display control, and a sound control. The vibration control is a control for vibrating the vibration motor 68 of the remote operation apparatus 20. The display control is a control for displaying "a notification screen for notifying the user US that the interference object OBS is present" on the display device 70 of the remote operation apparatus 20. The sound control is a control for causing the speaker 72 of the remote operation apparatus 20 to output a predetermined notification sound.

The present apparatus 10 can notify the user US that the interference object OBS is present by executing the notification control. The notification control can increase a possibility that the user US moves to a position where the user US's line of sight is not interfered by the interference object OBS and the user US can visually monitor the vehicle. This prevents an increasing in a contact possibility that the vehicle VA contacts with an object when the interference object OBS is present.

Furthermore, since the present apparatus 10 executes the low-speed control when the interference object OBS is present, the upper limit speed Vlmt is set to a smaller value when the interference object OBS is present than when the interference object OBS is not present. This allows the vehicle VA to be stopped immediately when the contact possibility becomes high. This prevents the increasing in the contact possibility when the interference object OBS is present.

(Specific Operation)

Figure 3:
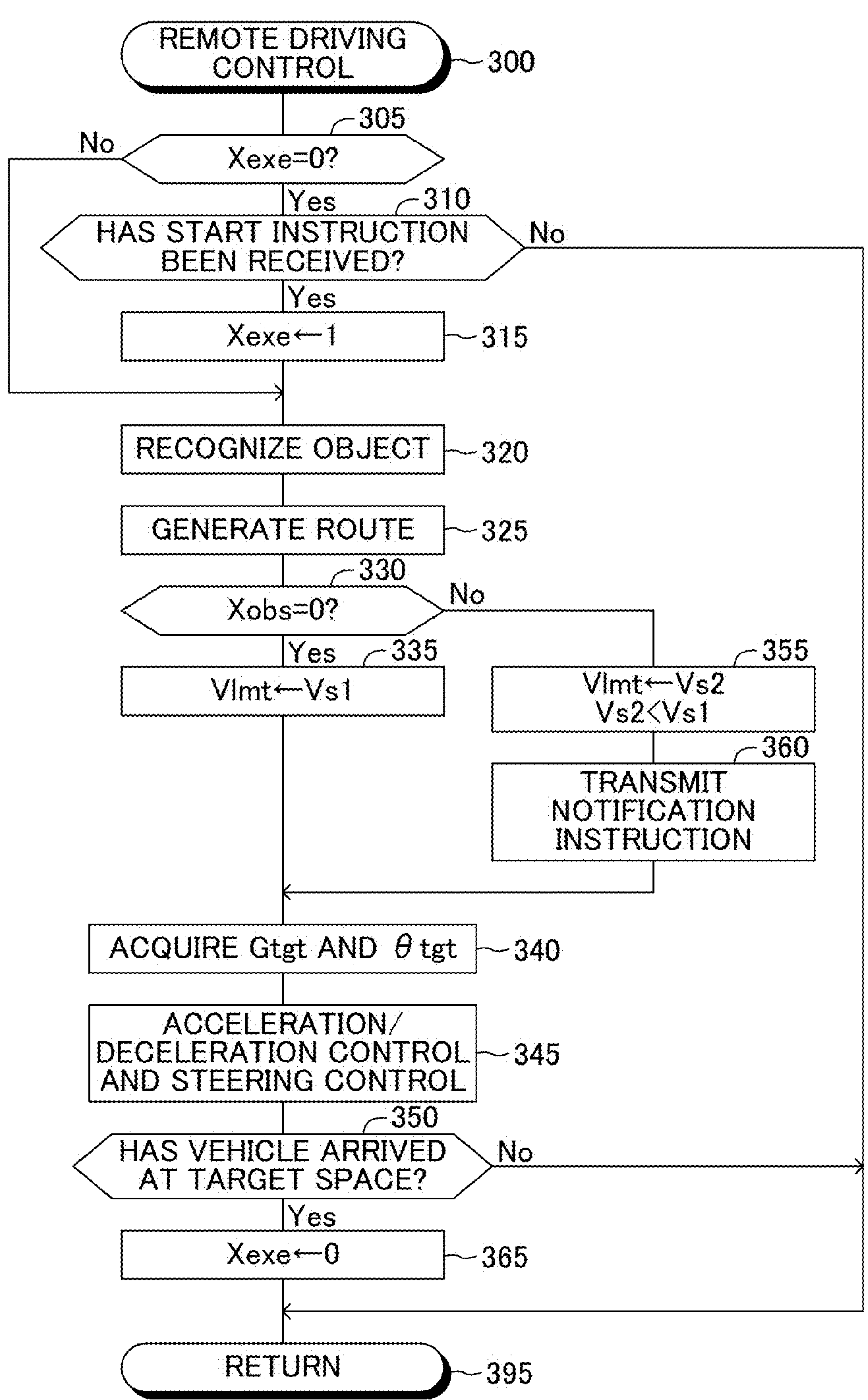
FIG. 3 is a flowchart illustrating a remote driving control routine executed by a CPU of an ECU shown in FIG. 1.
Figure 4:
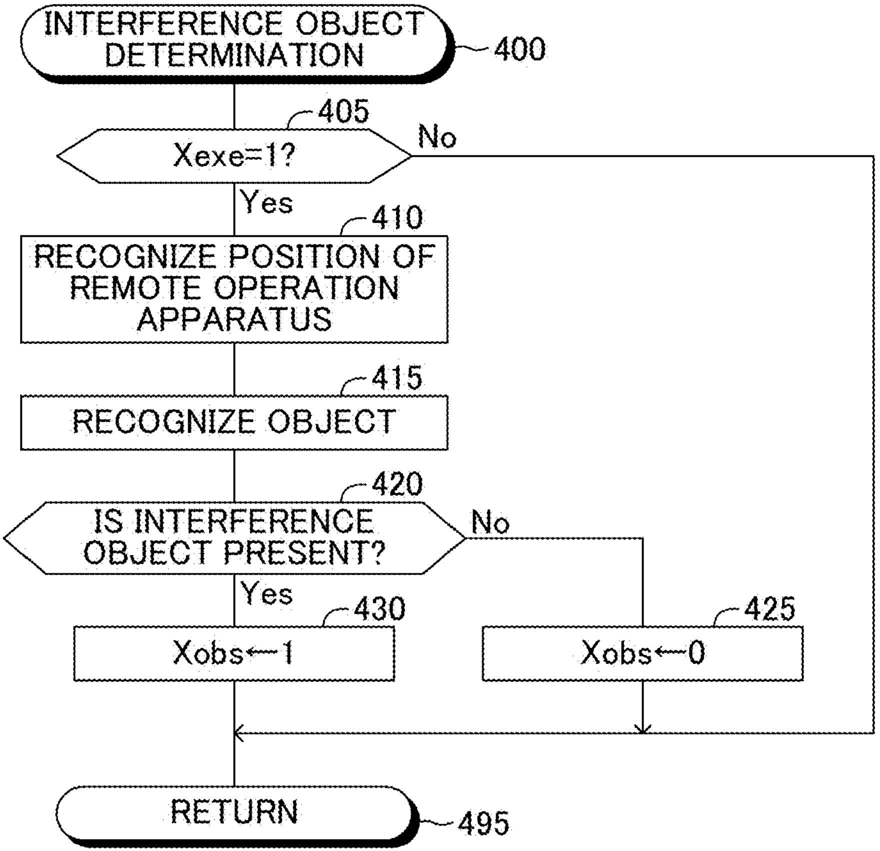
FIG. 4 is a flowchart illustrating an interference object determination routine executed by the CPU of the ECU shown in FIG. 1.

The CPU of the ECU 30 of the present apparatus 10 executes routines shown in flowcharts in FIG. 3 and FIG. 4, each time a predetermined time has elapsed. Hereinafter, the "CPU" means the CPU of the ECU 30.

When an appropriate time comes, the CPU starts a process from step 300 of FIG. 3, and at step 305 the CPU determines whether or not an execution flag Xexe is "0".

The execution flag Xexe is set to "1" when the remote driving control starts, and the execution flag Xexe is set to "0" when the remote driving control ends. The execution flag Xexe is set to "0" in an initialization routine. The initialization routine is executed by the CPU when an ignition key switch of the vehicle VA is changed from an off position to an on position.

When the execution flag Xexe is "0", the CPU makes a "Yes" determination at step 305 and the process proceeds to step 310. At step 310, the CPU determines whether or not the present apparatus 10 has received a start instruction from the remote operation apparatus 20.

The remote operation apparatus 20 transmits the start instruction to the present apparatus 10 when the user US operates a start button (not shown) after the user US designated the target space.

When the present apparatus 10 has not received the start instruction, the CPU makes a "No" determination at step 310, and the process proceeds to step 395. At step 395, the CPU terminates the present routine tentatively.

When the present apparatus 10 receives the start instruction, the CPU makes a "Yes" determination at step 310 and executes steps 315 to 330.

Step 315: The CPU sets the execution flag Xexe to "1".

Step 320: The CPU recognizes (identifies) the position of the object around the vehicle VA relative to vehicle VA based on the front image, the rear image, and the sonar data.

Step 325: The CPU generates a route to the target space such that the vehicle VA does not contact with the object.

Step 330: The CPU determines whether or not an interference flag Xobs is "0".

The interference flag Xobs is set to "1" when the interference object OBS is present, and the interference flag Xobs is set to "0" when the interference object OBS is not present. The interference flag Xobs is set to "0" in the initialization routine. When the interference flag Xobs is "0", the CPU makes a "Yes" determination at step 330 and executes steps 335 to 350.

Step 335: The CPU sets the upper limit speed Vlmt to the speed Vs1.

Step 340: The CPU acquires a target acceleration Gtgt and a target steered angle θtgt for vehicle VA to travel the route so that the vehicle speed Vs does not exceed the upper limit speed Vlmt.

In addition, when a distance between vehicle VA and the object becomes equal to or shorter than a threshold distance, the CPU acquires the target acceleration Gtgt for stopping vehicle VA. In this case, the target acceleration Gtgt is set to a negative value.

Step 345: The CPU controls the powertrain actuator 46 and the brake actuator 48 so that an acceleration G of the vehicle VA matches the target acceleration Gtgt, and controls the steering motor 50 so that the steered angle θ matches the target steered angle θtgt.

Step 350: The CPU determines whether or not the vehicle VA has arrived at the target space.

When the vehicle VA has not arrived at the target space, the CPU makes a "No" determination at step 350, and the process proceeds to step 395. At step 395, the CPU terminates the present routine tentatively.

In a case where the execution flag Xexe is "1" when the process proceeds to step 305, the CPU makes a "No" determination at step 305 and the process proceeds to step 320. In a case where the interference flag Xobs is "1" when the process proceeds to step 330, the CPU makes a "No" determination at step 330 and executes steps 355 and 360.

Step 355: The CPU sets the upper limit speed Vlmt to "the speed Vs2 lower than speed Vs1".

Step 360: The CPU transmits a notification instruction to the remote operation apparatus 20 for causing the remote operation apparatus 20 to execute the notification control.

Thereafter, the process proceeds to step 340.

In a case where the vehicle VA has arrived at the target space when the process proceeds to step 350, the CPU makes a "Yes" determination at step 350 and the process proceeds to step 365. At step 365, the CPU sets the execution flag Xexe to "0". Thereafter, the process proceeds to step 395 and the CPU terminates the present routine tentatively.

<Interference Object Determination Routine>

When the appropriate time comes, the CPU starts a process from step 400 of FIG. 4, and at step 405 the CPU determines whether or not the execution flag Xexe is "1".

When the execution flag Xexe is "0", the CPU makes a "No" determination at step 405, and the process proceeds to step 495. At step 495, the CPU terminates the present routine tentatively.

When the execution flag Xexe is "1", the CPU makes a "Yes" determination at step 405 and executes steps 410 to 420.

Step 410: The CPU recognizes (identifies) the position of the remote operation apparatus 20 relative to the present apparatus using the UWB wireless communication.

Step 415: The CPU recognizes (identifies) the position of the object around the vehicle VA based on the front image, the rear image, and the sonar data.

Step 420: The CPU determines whether or not the interference object OBS is present.

When the interference object OBS is not present, the CPU makes a "No" determination at step 420 and the process proceeds to step 425. At step 425, the CPU sets the interference flag Xobs to "0". Thereafter, the process proceeds to step 495 and the CPU terminates the present routine tentatively.

When the interference object OBS is present, the CPU makes a "Yes" determination at step 420 and the process proceeds to step 430. At step 430, the CPU sets the interference flag Xobs to "1". Thereafter, the process proceeds to step 495 and the CPU terminates the present routine tentatively.

As a result of the above, the present apparatus 10 executes the interference control when the interference object OBS is present, so the present apparatus 10 can prevent the increasing in the contact possibility when the interference object OBS is present.

First Modification Example

The remote driving control apparatus 10 according to the present modification example changes a control manner of the interference control depending on whether the interference object OBS is a moving object or a stationary object. In detail, when the interference object is the stationary object, the CPU of the ECU 30 strengthens the interference control compared to when the interference object is the moving object.

<Notification Control>

When the interference object OBS is the stationary object, the notification control is executed in the following manner. Therefore, when the interference object OBS is the stationary object, a notification of the notification control is strengthened. When the interference object OBS is the stationary object, a vibration cycle of the vibration control is shorter than when the interference object OBS is the moving object.

When the interference object OBS is the stationary object, the notification screen is displayed in a flashing manner, and when the interference object OBS is the moving object, the notification screen is displayed constantly. As another example, when the interference object OBS is the stationary object, a message for moving the user US to a position where the user US can see the vehicle VA may be displayed on the notification screen.

When the interference object OBS is the stationary object, an output cycle of the notification sound of the sound control is shorter than when the interference object OBS is the moving object.

Hereinafter, the notification control that is executed when the interference object OBS is the moving object is referred to as “a weak notification control”, and the notification control that is executed when the interference object OBS is the stationary object is referred to as “a strong notification control”.

<Low-Speed Control>

When the interference object OBS is the moving object, the upper limit speed Vlmt is set to “a speed Vs3 lower than the speed Vs1”. When the interference object OBS is the stationary object, the upper limit speed Vlmt is set to “a speed Vs4 lower than speed Vs3”.

When the interference object OBS is the stationary object, there is a higher possibility that the user US cannot see the vehicle VA for a longer time than when the interference object OBS is the moving object. For this reason, the interference control is strengthened in the present modification example.

The present modification example is described in more detail.

When the interference object OBS is present, the CPU determines whether or not the interference object OBS is the stationary object. When the interference object OBS is the stationary object, the CPU sets a first interference flag Xobs1 to “1” and a second interference flag Xobs2 to “0”. On the other hand, when the interference object OBS is the moving object, the CPU sets the first interference flag Xobs1 to “0” and the second interference flag Xobs2 to “1”. The first interference flag Xobs1 and the second interference flag Xobs2 are never both set to “1” at the same time.

When the interference object OBS is not present, the CPU sets the first interference flag Xobs1 and the second interference flag Xobs2 to “0”.

Figure 5:
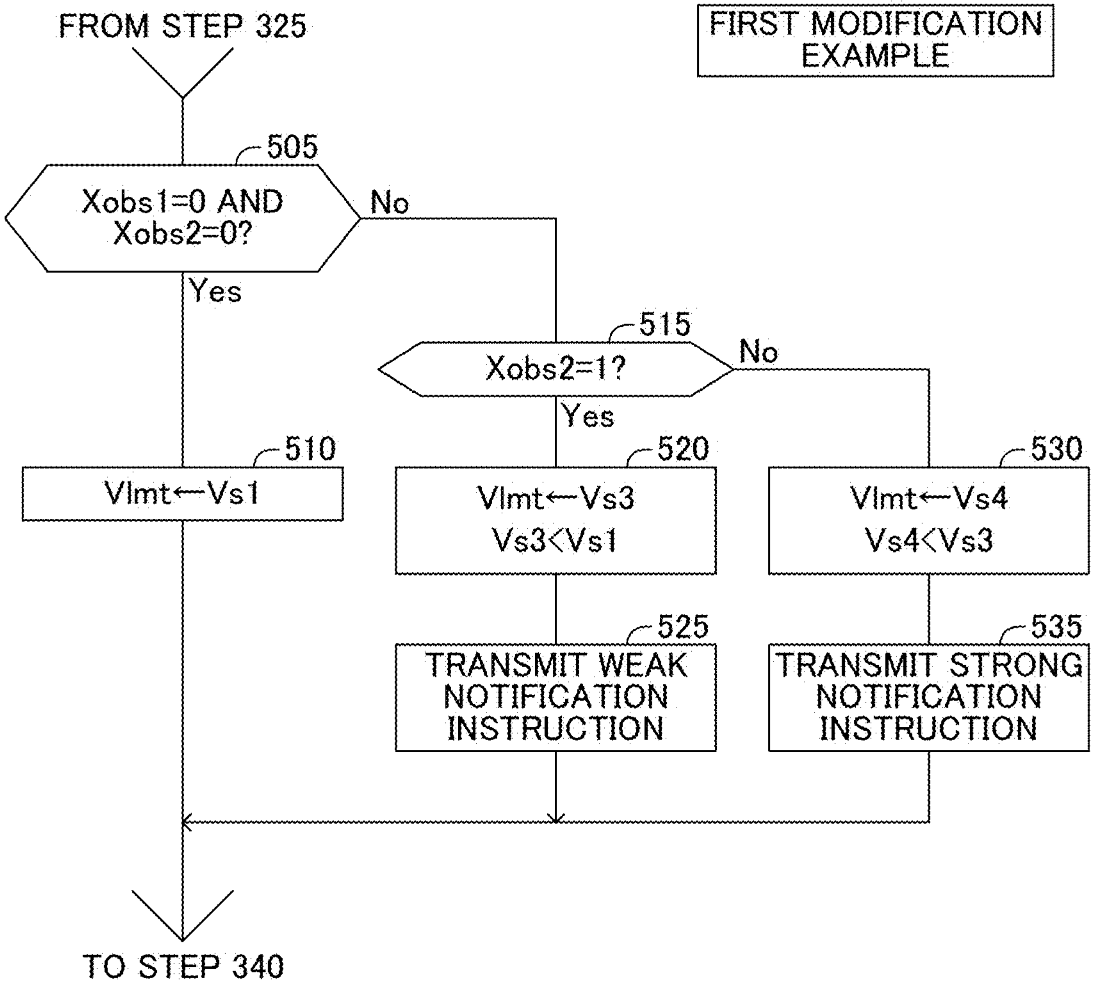
FIG. 5 is a flowchart illustrating a part of the remote driving control routine executed by the CPU of the ECU of the remote driving control apparatus according to a first modification example of the embodiment of the present disclosure.

In the present modification example, when the CPU executes step 325 shown in FIG. 3, the process proceeds to step 505 shown in FIG. 5. At Step 505, the CPU determines whether or not the first interference flag Xobs1 is “0” and the second interference flag Xobs2 is “0”.

When the first interference flag Xobs1 is “0” and the second interference flag Xobs2 is “0” (i.e. when the interference object OBS is not present), the CPU makes a “Yes” determination at step 505 and the process proceeds to step 510. At step 510, the CPU sets the upper limit speed Vlmt to the speed Vs1. Thereafter, the process proceeds to step 340 shown in FIG. 3.

When at least one of the first interference flag Xobs1 and the second interference flag Xobs2 is “1”, the CPU makes a “No” determination at step 505, and the process proceeds to step 515.

At step 515, the CPU determines whether or not the second interference flag Xobs2 is “1”. When the second interference flag Xobs2 is “1” (i.e., when the interference object OBS is the moving object), the CPU makes a “Yes” determination at step 515 and executes steps 520 and 525.

Step 520: The CPU sets the upper limit speed Vlmt to “the speed Vs3 lower than speed Vs1”.

Step 525: The CPU transmits a weak notification instruction to the remote operation apparatus 20.

When the remote operation apparatus 20 receives the weak notification instruction, the remote operation apparatus 20 executes the weak notification control. Thereafter, the process proceeds to step 340 shown in FIG. 3.

In a case where the second interference flag Xobs2 is “0”, in other words, in a case where the first interference flag Xobs1 is “1” (that is, in a case where the interference object OBS is the stationary object) when the process proceeds to step 515, the CPU makes a “No” determination at step 515 and executes steps 530 and 535.

Step 530: The CPU sets the upper limit speed Vlmt to “the speed Vs4 lower than the speed Vs3”.

Step 535: The CPU transmits a strong notification instruction to the remote operation apparatus 20.

When the remote operation apparatus 20 receives the strong notification instruction, the remote operation apparatus 20 executes the strong notification control.

Thereafter, the process proceeds to step 340 shown in FIG. 3.

Second Modification Example

The remote driving control apparatus 10 according to the present modification example measures a presence time T that the interference object OBS is present, and the longer the presence time T, the stronger the interference control.

When the CPU determines that the interference object OBS is present, the CPU measures the presence time T by adding an execution interval of the interference object determination routine to the presence time T. When the CPU determines that the interference object OBS is not present, the CPU sets the presence time T to “0”.

Figure 6:
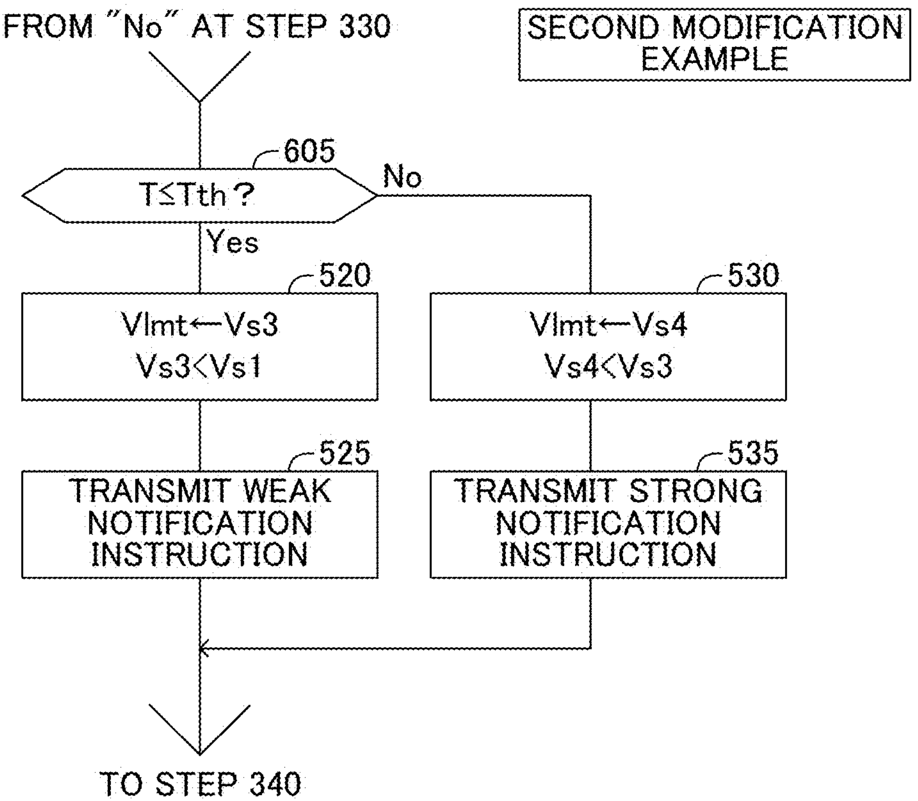
FIG. 6 is a flowchart illustrating a part of the remote driving control routine executed by the CPU of the ECU of the remote driving control apparatus according to a second modification example of the embodiment of the present disclosure.

In the present modification example, when the CPU makes a “No” determination at step 330 shown in FIG. 3 (i.e., when the interference flag Xobs is “1”), the process proceeds to step 605 shown in FIG. 6. In the flowchart shown in FIG. 6, the same processes as the processes shown in FIG. 5 are given the same symbols, and their explanations are omitted.

At step 605, the CPU determines whether or not the presence time T is equal to or smaller a predetermined threshold time Tth.

When the presence time T is equal to or smaller than the threshold time Tth, the CPU makes a “Yes” determination at step 605 and executes steps 520 and 525 as shown in FIG. 6. Thereafter, the process proceeds to step 340 as shown in FIG. 3.

When the presence time T is greater than the threshold time Tth, the CPU makes a “No” determination at step 605 and executes steps 530 and 535 shown in FIG. 6. Thereafter, the process proceeds to step 340 shown in FIG. 3.

According to the present modification example, the longer the presence time T, the stronger the interference control. As a result, the remote driving control apparatus 10 according to the present modification example can increase a possibility that the user US notices that the user US is not monitoring the vehicle VA to take an appropriate action, the longer a time that the user US is unable to see the vehicle VA. Further, the remote driving control apparatus 10 according to the present modification example can decrease the possibility that the vehicle VA contacts with the object.

In the above description, the present apparatus 10 executes the notification control and the low-speed control as the interference control, but the present apparatus 10 may execute at least one of the notification control and the low-speed control as the interference control. In the above description, the smart summon or the reverse summon is given as an example of the remote driving control, but the remote driving control is not limited to these. The remote driving control is only required to control the vehicle VA to drive to the target space according to the operation of the user US outside the vehicle VA.

In the above embodiment, the present apparatus 10 uses the UWB wireless communication to recognize (identify) the position of the remote operation apparatus 20 relative to the vehicle VA, but recognition of the position of the remote operation apparatus 20 is not limited to this. The present apparatus 10 may recognize (identify) the position of the remote operation apparatus 20 relative to the vehicle VA based on the current position of the vehicle VA which is identified by the GNSS receiver 40 and the current position of the remote operation apparatus 20 which is identified by the GNSS receiver 66.

The remote operation apparatus 20 is not limited to the smartphone, and may be an electronic key or an operation terminal installed in the parking lot. Such an operation terminal is used in common by users US who use the parking lot.

The present apparatus 10 may be applied to (or installed in/on) an engine vehicle, a hybrid electric vehicle (HEV), a plug-in hybrid electric vehicle (PHEV), a fuel cell electric vehicle (FCEV), and a battery electric vehicle (BEV). Furthermore, the remote driving control is a kind of an automatic driving.

What is claimed is:

1. A remote driving control apparatus configured to execute a remote driving control for driving a vehicle to a target space according to a driving instruction from a remote operation apparatus operated by a user outside the vehicle, wherein, the remote driving control apparatus is configured to execute at least one of a notification control and a low-speed control as an interference control when an interference object that prevents the user from seeing the vehicle is present between the remote operation apparatus and the vehicle, the notification control being a control for notifying the user that the interference object is present, and the low-speed control being a control for setting an upper limit speed to a smaller value than when the interference object is not present.

2. The remote driving control apparatus according to claim 1, wherein, the remote driving control apparatus is configured to change a control manner depending on whether the interference object is a moving object or a stationary object.

3. The remote driving control apparatus according to claim 2, wherein, the remote driving control apparatus is configured to:

in a case where the notification control is executed as the interference control, strengthen a notification manner of the notification control when the interference object is the stationary object, compared to when the interference object is the moving object; and in a case where the low-speed control is executed as the interference control, set the upper limit speed to a smaller value when the interference object is the stationary object than when the interference object is the moving object.

4. The remote driving control apparatus according to claim 1, wherein, the remote driving control apparatus is configured to:

in a case where the notification control is executed as the interference control, strengthen a notification manner of the notification control as a presence time that the interference object is present increases; and in a case where the low-speed control is executed as the interference control, set the upper limit speed to a smaller value as the presence time increases.

5. The remote driving control apparatus according to claim 1, wherein, the remote operation apparatus is a smartphone, and the remote driving control apparatus is configured to execute, as the notification control, at least one of a vibration control for vibrating the remote operation apparatus, a sound control for causing the remote operation apparatus to output a sound and a display control for causing the remote operation apparatus to display a notification screen for informing the user that the interference object is present.

* * * * *